United States Patent
Ito et al.

(10) Patent No.: US 9,601,889 B2
(45) Date of Patent: Mar. 21, 2017

(54) CONNECTION METHOD OF TERMINAL

(75) Inventors: Naoki Ito, Makinohara (JP); Kouichiro Matsushita, Makinohara (JP)

(73) Assignee: Yazaki Corporation, Tokyo (JP)

( * ) Notice: Subject to any disclaimer, the term of this patent is extended or adjusted under 35 U.S.C. 154(b) by 607 days.

(21) Appl. No.: 13/809,723

(22) PCT Filed: Jul. 14, 2011

(86) PCT No.: PCT/JP2011/066075
§ 371 (c)(1),
(2), (4) Date: Jan. 11, 2013

(87) PCT Pub. No.: WO2012/008519
PCT Pub. Date: Jan. 19, 2012

(65) Prior Publication Data
US 2013/0112738 A1    May 9, 2013

(30) Foreign Application Priority Data
Jul. 14, 2010  (JP) .................................. 2010-159924

(51) Int. Cl.
  *H01R 43/02*    (2006.01)
  *B23K 101/32*   (2006.01)
  (Continued)

(52) U.S. Cl.
  CPC ......... *H01R 43/0249* (2013.01); *H01R 4/023* (2013.01); *H01R 4/187* (2013.01);
  (Continued)

(58) Field of Classification Search
  USPC ........... 439/874, 877, 879; 228/131; 29/854, 29/857, 859–861
  See application file for complete search history.

(56) References Cited

U.S. PATENT DOCUMENTS 4,966,565 A    10/1990  Dohi
5,808,260 A *  9/1998  Asakura et al. ........... 219/56.22
(Continued)

FOREIGN PATENT DOCUMENTS

CN    101151769 A    3/2008
JP    1-128384 A     5/1989
(Continued)

OTHER PUBLICATIONS

International Search Report (PCT/ISA/210), dated Oct. 18, 2011, issued by the International Searching Authority in counterpart International Patent Application No. PCT/JP2011/066075.
(Continued)

*Primary Examiner* — Devang R Patel
(74) *Attorney, Agent, or Firm* — Sughrue Mion, PLLC

(57) ABSTRACT

A connection method of a terminal includes an inserting-arranging process for inserting and arranging conductors of a plurality of wires into a connection section. The wires have the conductor sections exposed from the sheaths thereof at the end portions. The connection section has cylindrical shape with a bottom portion and an opening section. The method further includes a heating-melting process for heating the connection section in a state that the opening section of the connection section faced upwards in the vertical direction to melt the conductors within the connection section, and a molten-metal raising process for conducting an insertion of the conductors into the connection section and/or a pressurization of the connection section from outside to raise the molten metal within the connection section to a level upper.

1 Claim, 4 Drawing Sheets

(51) Int. Cl.
*H01R 4/02* (2006.01)
*H01R 4/18* (2006.01)
*H01R 4/22* (2006.01)

(52) U.S. Cl.
CPC ........... *H01R 4/22* (2013.01); *H01R 43/0207* (2013.01); *B23K 2201/32* (2013.01)

(56) References Cited

U.S. PATENT DOCUMENTS

| | | | |
|---|---|---|---|
| 6,643,926 B2* | 11/2003 | Sakaguchi et al. | 29/863 |
| 6,666,732 B1* | 12/2003 | Endacott | 439/874 |
| 7,121,903 B2* | 10/2006 | Sakaguchi et al. | 439/877 |
| 7,174,633 B2* | 2/2007 | Onuma | 29/854 |
| 2004/0168315 A1 | 9/2004 | Onuma | |
| 2007/0184715 A1 | 8/2007 | Onuma | |
| 2009/0229880 A1 | 9/2009 | Watanabe | |
| 2009/0249616 A1 | 10/2009 | Froschl | |

FOREIGN PATENT DOCUMENTS

| | | | |
|---|---|---|---|
| JP | 02103876 A * | | 4/1990 |
| JP | 9-82377 A | | 3/1997 |
| JP | 09082377 A * | | 3/1997 |
| JP | 09-161936 A | | 6/1997 |
| JP | 10-199599 A | | 7/1998 |
| JP | 2001-110464 A | | 4/2001 |
| JP | 2004-71437 A | | 3/2004 |
| JP | 2004-200094 A | | 7/2004 |
| JP | 2009-152051 A | | 7/2009 |
| JP | 2009-539207 A | | 11/2009 |
| WO | 2009/081799 A1 | | 7/2009 |

OTHER PUBLICATIONS

Written Opinion (PCT/ISA/237), dated Oct. 18, 2011, issued by the International Searching Authority in counterpart International Patent Application No. PCT/JP2011/066075.
Communication issued Aug. 25, 2014, in corresponding Japanese Patent Application No. 2010-159924.
Office Action dated Jun. 24, 2014, issued by the Japanese Patent Office in counterpart Japanese Application No. 2010-159924.
Office Action dated Jun. 26, 2014, issued by the Korean Intellectual Property Office in counterpart Korean Application No. 10-2013-7000993.
Office Action dated Sep. 16, 2014, issued by the State Intellectual Property Office of the People's Republic of China in counterpart Chinese Application No. 201180034683.7.
Notice of Decesion of Rejection dated Dec. 20, 2014, issued by the Korean Intellectual Property Office in counterpart Korean Application No. 10-2013-7000993.
Office Action dated Apr. 24, 2015, issued by the State Intellectual Property Office of P.R. China in counterpart Chinese Application No. 201180034683.7.

* cited by examiner (a)

(b)

(c)

11 TERMINAL
12 CONNECTION SECTION
12a OPENING SECTION
21 WIRES
22 CONDUCTORS
23 SHEATHS

CONNECTION METHOD OF TERMINAL

TECHNICAL FIELD

The invention relates to a connection method of a terminal for connecting a terminal to end portions of wires.

BACKGROUND ART

When connecting a terminal to end portions of wires, it is general to crimp a crimping section of the terminal to conductors of the wires exposed from a sheath (for example, refer to Patent Document 1).

Also, there is a method of melting metal solder impregnated into a core wire section of a wire and thus connecting a terminal and the core wire section through the metal solder (for example, refer to Patent Document 2). Also, there is a method of filling a crimping place with a conductive adhesive to thus infiltrate the conductive adhesive into a gap such as between wire elements (refer to Patent Document 3). Also, there is a method of pre-heating a crimping section of a terminal to thus crimp the crimping section to a conductor of an aluminum wire with plated tin being softened (refer to Patent Document 4).

Also, a method of thermally crimping conductors of respective wires of a plurality of wire bundles to a terminal has been known (for example, refer to Patent Document 5).

PRIOR ART DOCUMENTS

Patent Documents

[Patent Document 1] JP-A-2001-110464
[Patent Document 2] JP-A-9-82377
[Patent Document 3] JP-A-2004-200094
[Patent Document 4] JP-A-2009-152051
[Patent Document 5] JP-A-10-199599

SUMMARY OF THE INVENTION

Problems to be Solved by the Invention

When connecting a plurality of wires, as a bundle, to a terminal, the conductors of all wires may not be sufficiently connected with the connection by the crimping or thermal crimping, as disclosed in Patent Document 1 and 5.

In this case, when the connecting material such as metal solder and conductive adhesive is impregnated or filled, as described in Patent Document 2 and 3, or when the plated tin is melted and then the crimping is performed, as described in Patent Document 4, it is possible to increase a connection force of the conductors somewhat. However, when the connecting material is used or tin is plated at the inside of the terminal, the cost is increased and the connection operation becomes troublesome.

The invention has been made to solve the above problems. An object of the invention is to provide a connection method of a terminal capable of connecting a plurality of wires to a terminal easily and with reliability without increasing the cost therefor.

Means for Solving the Problems

In order to achieve the above object, a connection method of a terminal of the invention is characterized by a following configuration (1).
(1) A connection method of a terminal comprising:

an inserting and arranging process of inserting and arranging, as a bundle, conductors of a plurality of wires, which are exposed from sheaths at end portions of the wires, into a connection section, which has a cylindrical shape with a bottom portion and an opening section at one side of the connection section, wherein the terminal is formed of metal material and has the connection section;

a heating and melting process of heating the connection section with the opening section of the connection section being faced upwards in a vertical direction to melt the conductors within the connection section; and a molten metal raising process of performing both or either one of an insertion of the conductors into the connection section and a pressurization of the connection section from an outside to raise the molten metal within the connection section to an upper level than end portions of the sheaths of the wires in the vertical direction.

According to the connection method of a terminal having the above configuration (1), it is possible to enable the molten metal to uniformly spread or permeate between the conductors of the plurality of wires very easily. Thereby, it is possible to favorably integrate the conductors of the wires with the connection section of the terminal and to connect the wires to the terminal with reliability.

Also, it is possible to prevent the cost from being increased, which is caused when the high-priced connecting material is used or when the plating becoming the connecting material is performed in advance.

Advantageous Effects of the Invention

According to the invention, it is possible to provide a connection method of a terminal capable of connecting a plurality of wires to a terminal easily and with reliability without increasing the cost therefor.

The invention has been briefly described. The detailed configurations of the invention will be further cleared by reading illustrative embodiments for implementing the invention with reference to the accompanying drawings.

BRIEF DESCRIPTION OF THE DRAWINGS

FIG. 4 illustrates a connection method of a terminal, in which FIG. 4(a) is a perspective view of the terminal and the end portions of the wires, FIG. 4(b) is a perspective view of the terminal and a heater and FIG. 4(c) is a sectional view of the terminal.

MODE FOR CARRYING OUT THE INVENTION

Hereinafter, an illustrative embodiment of the invention will be described with reference to the drawings.

Figure 1:
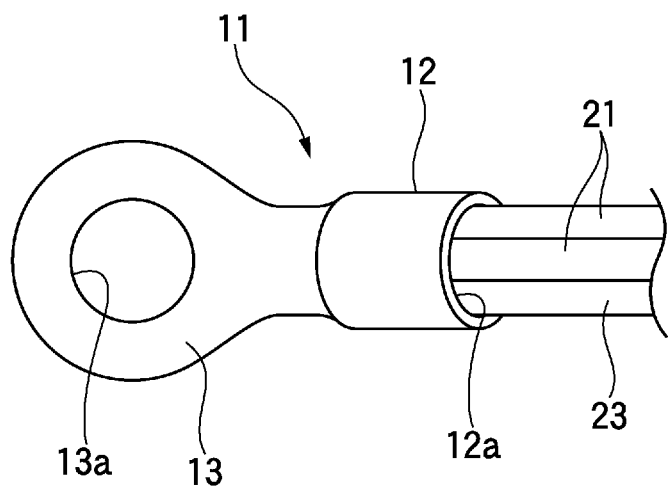
FIG. 1 is a perspective view of a terminal which is connected by a connection method of a terminal according to an illustrative embodiment of the invention.
Figure 2:
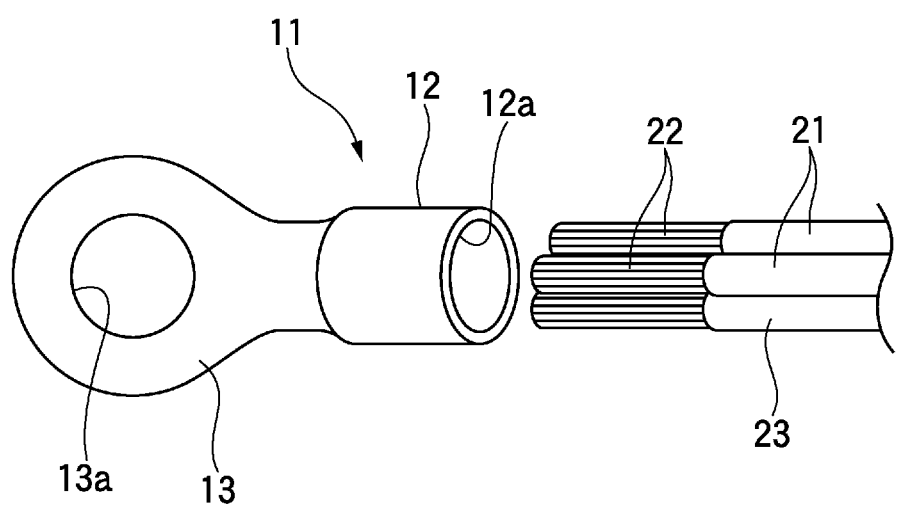
FIG. 2 is a perspective view of the terminal and end portions of wires which are connected to the terminal.
Figure 3:
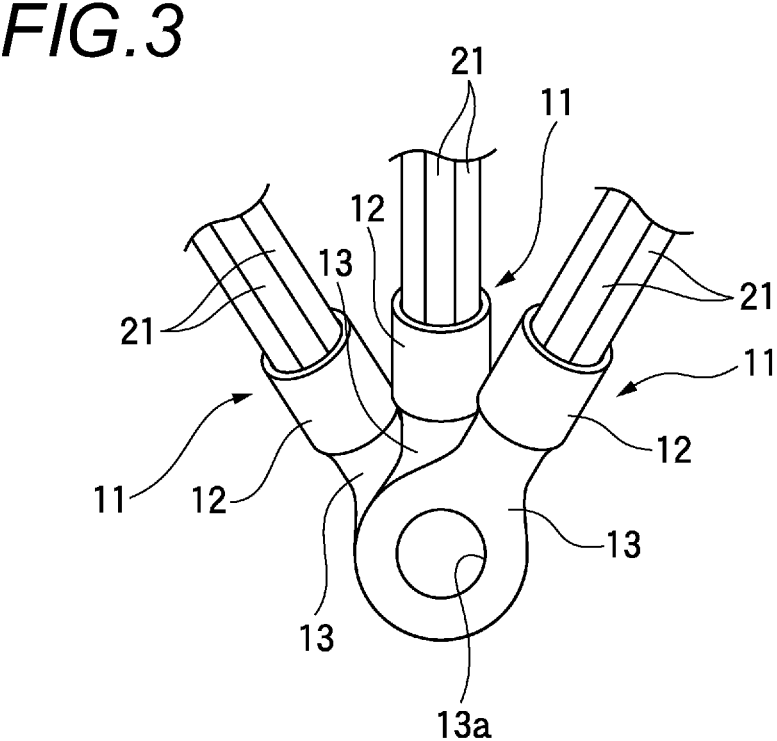
FIG. 3 is a perspective view showing using aspects of the terminal.

FIG. 1 is a perspective view of a terminal that is connected by a connection method of a terminal according to an illustrative embodiment of the invention, FIG. 2 is a perspective view of the terminal and end portions of wires that are connected to the terminal and FIG. 3 is a perspective view showing using aspects of the terminal.

As shown in FIGS. 1 and 2, a terminal 11 has a connection section 12 and a connection terminal section 13 and is made of metal material such as copper, copper alloy and the like. The connection section 12 has a cylindrical shape with a bottom portion and an opening section 12a at one side thereof that is an opposite end portion to the connection terminal section 13. Also, the connection terminal section 13 has a flat plate shape and a connection hole 13a formed at a central portion thereof. A fixing bolt (not shown) for connection to a place to be fixed is inserted through the connection hole 13a.

A plurality of wires 21 bound as a bundle is connected to the connection section 12 of the terminal 11. The wires 21 have conductors 22 and sheaths 23 covering the conductors 22. The conductor 22 of the wire 21 is formed of a metal material such as aluminum or aluminum alloy having a melting point lower than the terminal 11. The sheath 23 is formed of a synthetic resin material having superior heat resistance such as polypropylene (PP) resin.

The terminal 11 is used as an earth terminal of a vehicle, for example, and the connection terminal section 13 is connected to a body panel, an engine block and the like of a vehicle such as automobile. Earth current flowing in the wires 21 flows to the body panel, the engine block and the like through the terminal 11.

In particular, the wires 21 are connected to the connection section 12 of the terminal 11. Therefore, as shown in FIG. 3, it is possible to connect the plurality of wires 21 to a place to be fixed by overlapping the connection terminal sections 13 of a plurality of the terminals 11 to thus enable the connection holes 13a to communicate with each other and fixing the terminals to the place to be fixed through a fixing bolt inserted into the connection holes 13a.

Figure 4:
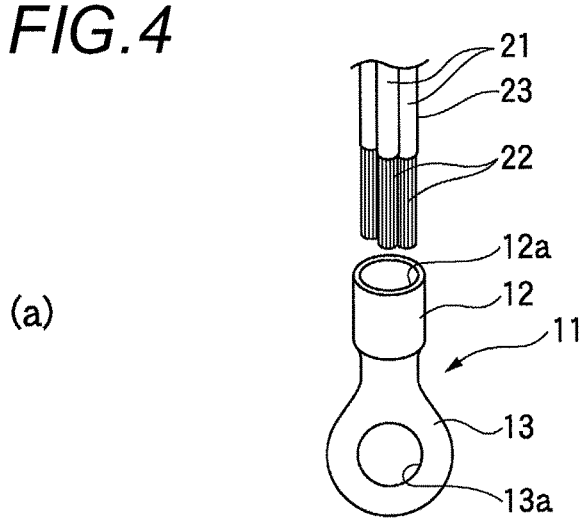
Figure 4:
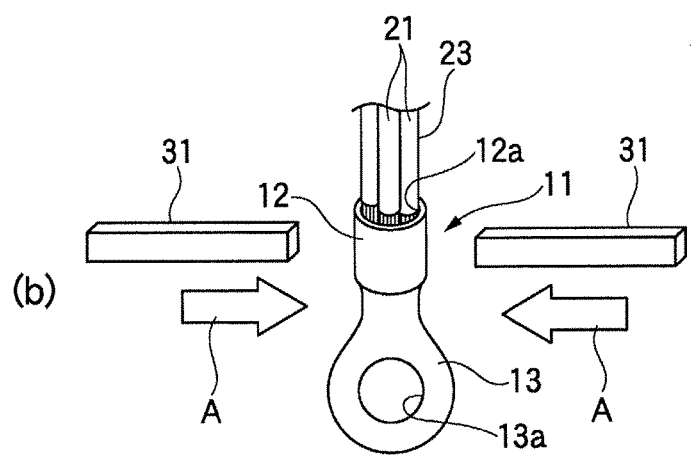
Figure 4:
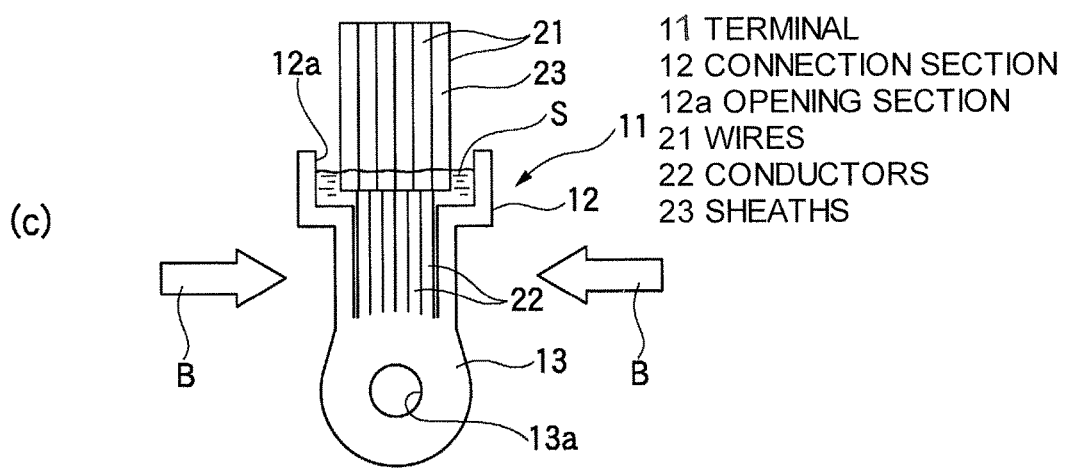

Subsequently, when connecting the wires 21 to the terminal 11, the respective processes thereof are described. FIGS. 4(a) to 4(c) illustrate a connection method of a terminal.

(Inserting and Arranging Process)

As shown in FIG. 4(a), the plurality of wires 21, which have the conductors 22 exposed from the sheaths 23 at the end portions thereof, are bound as a bundle, and the conductors 22 exposed from the sheaths 23 of the wires 21 are bound as a bundle and inserted and arranged into the connection section 12 of the terminal 11.

(Heating and Melting Process)

As shown in FIG. 4(b), the opening section 12a of the connection section 12 of the terminal 11 is faced upwards in a vertical direction and the connection section 12 is heated from sides thereof (an arrow A direction in FIG. 4(b)) by heaters 31. As a result, the conductors 22 of the wires 21 are melted within the connection section 12. By doing so, the molten metal is stored in the connection section 12.

(Molten-Metal Raising Process)

As shown in FIG. 4(c), the conductors 22 are further inserted into the connection section 12 and the connection section 12 is pressurized from the sides (an arrow B direction in FIG. 4(c)), thereby raising the molten metal S in the connection section 12 to an upper level than the end portions of the sheaths 23 of the wires 21 in the vertical direction. In order to insert the conductors 22 into the connection section 12, it has only to lower the wires 21 or to raise the terminal 11. Also, both the lowering of the wires 21 and the raising of the terminal 11 may be performed.

In the meantime, the insertion of the conductors 22 into the connection section 12 or the pressurization of the connection section 12 from the outside may be performed to raise the molten metal S to the upper level than the end portions of the sheaths 23 of the wires 21 in the vertical direction.

(Cooling and Solidifying Process)

After that, the terminal 11 is cooled to solidify the molten metal S within the connection section 12.

By performing the above processes, it is possible to enable the molten metal S to uniformly spread between the conductors 22 of the plurality of wires 21 very easily. Thereby, it is possible to favorably integrate the conductors 22 of the wires 21 with the connection section 12 of the terminal 11 and to thus connect the wires to the terminal with reliability.

Also, it is possible to prevent the cost from being increased, which is caused when the high-priced connecting material is used or when the plating becoming the connecting material is performed in advance.

Figure 5:
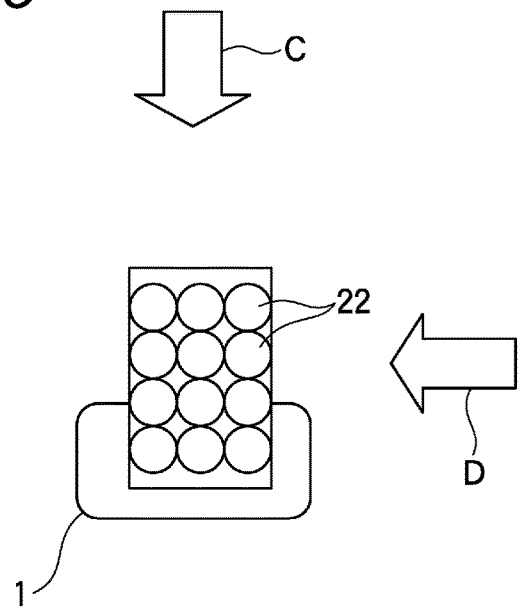
FIG. 5 is a schematic sectional view showing a connection method of a terminal in a reference example.

Here, a reference example is shown in FIG. 5 so as to illustrate the superiority of the invention., FIG. 5 is a schematic sectional view showing a connection method of a terminal in a reference example.

The reference example shows an ultrasonic connection in which the ultrasonic waves are applied to the conductors 22 of the wires 21 to thus perform the connection., As shown in FIG. 5, according to this connection method, a horn (not shown) is arranged at an opposite side to an anvil 1 as regards a bundle of the conductors 22. By the horn, ultrasonic vibrations are applied toward (toward an arrow C direction in FIG. 5) the bundle of the conductors 22.

However, according to this ultrasonic connection method, the applied ultrasonic waves do not sufficiently reach an opposite side to the applying side, so that the connection may be insufficient. Also, since the conductors 22 are arranged side by side, the strength of the ultrasonic waves may be scattered and thus weakened.

Therefore, in this case, after applying the ultrasonic vibrations once, it is necessary to again apply the ultrasonic vibrations to the bundle of the conductors 22 from a 90° different direction (an arrow D direction in FIG. 5), so that the connection operation becomes troublesome. Also, it is necessary to set respective connection conditions, depending on the number or arrangement of the conductors 22.

In the meantime, the invention is not limited to the above illustrative embodiment and can be appropriately modified and improved. In addition, the materials, shapes, sizes, the number, the arranging places and the like of the respective constitutional elements of the above illustrative embodiment are arbitrary and are not particularly limited insomuch as the object of the invention can be achieved.

Although the invention has been specifically described with reference to the specific illustrative embodiment, it is apparent to one skilled in the art that a variety of changes and modifications can be made without departing from the spirit and scope of the invention.

This application is based on Japanese Patent Application No. 2010-159924 filed on Jul. 14, 2010, the contents of which are incorporated herein by reference.

INDUSTRIAL APPLICABILITY

According to the connection method of a terminal of the invention, it is possible to connect the plurality of wires to the terminal easily and with reliability without increasing the cost therefor.

DESCRIPTION OF REFERENCE NUMERALS AND SIGNS

11: terminal
12: connection section
12a: opening section
21: wires
22: conductors
23: sheaths
S: molten metal

The invention claimed is:

1. A connection method of a terminal comprising:
an inserting and arranging process of inserting and arranging, as a bundle, conductors of a plurality of wires, which are exposed from sheaths at end portions of the wires, into a connection section, which has a cylindrical shape with a bottom portion and an opening section at one side of the connection section, wherein the terminal is formed of metal material and has the connection section;
a heating and melting process of heating the connection section with the opening section of the connection section being faced upwards in a vertical direction to melt the conductors within the connection section; and
a molten metal raising process of performing pressurization of the connection section from an outside to raise the molten metal within the connection section to an upper level disposed above end portions of the sheaths of the wires in the vertical direction such that said end portions are covered by the molten metal.

* * * * *